(12) United States Patent
Mohla et al.

(10) Patent No.: US 9,111,219 B1
(45) Date of Patent: Aug. 18, 2015

(54) PERFORMANCE BASED RECOMMENDATIONS

(71) Applicant: Amazon Technologies, Inc., Reno, NV (US)

(72) Inventors: Dave Mohla, Irvine, CA (US); Mihir Devraj Bhanot, Irvine, CA (US); Mitchell Kim, Irvine, CA (US); James Newton Adkins, III, Bellevue, WA (US); Sridhar Chellappa, Karnataka (IN); Devesh Khare, Tustin, CA (US); Vinod Kannan, Karnataka (IN)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 13/766,246

(22) Filed: Feb. 13, 2013

(51) Int. Cl.
*G06F 17/00* (2006.01)
*G06N 5/02* (2006.01)
*G06N 5/04* (2006.01)
*G06N 99/00* (2010.01)

(52) U.S. Cl.
CPC .. *G06N 5/04* (2013.01); *G06N 5/02* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 2010/0042932 A1* | 2/2010 | Lehtiniemi et al. | 715/747 |
| 2011/0225291 A1* | 9/2011 | Dobroth et al. | 709/224 |
| 2011/0282821 A1* | 11/2011 | Levy et al. | 706/47 |
| 2012/0079507 A1* | 3/2012 | Agarwal et al. | 719/321 |
| 2012/0291022 A1* | 11/2012 | Mehta et al. | 717/176 |
| 2013/0085886 A1* | 4/2013 | Satish et al. | 705/26.7 |
| 2014/0089531 A1* | 3/2014 | Bhogal et al. | 710/8 |
| 2014/0137080 A1* | 5/2014 | Huang et al. | 717/121 |

OTHER PUBLICATIONS

"Accurate Online Power Estimation and Automatic Battery Behavior Based Power Model Generation for Smartphones" Zhang et al, EECS Department, University of Michigan Ann Arbor, M I, USA; Copyright 2010 ACM 978-1-60558-905-3/10/10 . . . $10.00.*

"An analysis of power consumption in a smartphone" A. Carroll and G. Heiser, in Proc. of USENIX ATC, 2010.*

(Continued)

*Primary Examiner* — Kakali Chaki
*Assistant Examiner* — Luis Sitiriche
(74) *Attorney, Agent, or Firm* — Knobbe, Martens, Olson & Bear, LLP

(57) ABSTRACT

Systems and associated processes are disclosed for generating recommendations for users based on the computing device likely to be utilized by the user to execute an application, among other things. These systems and processes are described in the context of an interactive computing system that enables users to download applications for mobile devices or for other computing devices. The performance of applications running on the user's computing device can be monitored with the performance data being collected and provided to the interactive computing system. The interactive computing system can include a recommendation system or service that processes the performance data and using the performance data, among possibly other data, the recommendation system can recommend alternative applications to the user for download. Further, in some cases, the interactive computing system can recommend modifications to the user's computing device to improve the performance of the application running on the user's computing device.

23 Claims, 7 Drawing Sheets

(56) References Cited

OTHER PUBLICATIONS

"Which App? A recommender system of applications in markets: Implementation of the service for monitoring users' interaction"; Enrique Costa-Montenegro, Ana Belén Barragáns-Martínez, Marta Rey-López Expert Systems with Applications 39 (2012) 9367-9375.*

"AppJoy: Personalized Mobile Application Discovery" Bo Yan and Guanling Chen; Department of Computer Science, University of Massachusetts Lowell University Avenue, Lowell, MA 01854 MobiSys'11, Jun. 28-Jul. 1, 2011, Bethesda, Maryland, USA. Copyright 2011 ACM 978-1-4503-0643-0/11/06 . . . $10.00.*

"Identifying Diverse Usage Behaviors of Smartphone Apps" Xu et al; IMC'11, Nov. 2-4, 2011, Berlin, Germany. Copyright 2011 ACM 978-1-4503-1013-0/11/11 . . . $10.00.*

"A Hybrid Recommender System for Context-aware Recommendations of Mobile Applications" Wolfgang Woerndl, Christian Schueller, Rolf Wojtech Technische Universitaet Muenchen, Institut fuer Informatik 1-4244-0832-6/07/$20.00 © 2007 IEEE.*

* cited by examiner

PERFORMANCE BASED RECOMMENDATIONS

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). As another example, the web browsing histories of users can be analyzed to identify behavior-based associations between particular web sites and/or web pages.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Introduction

Figure 1:
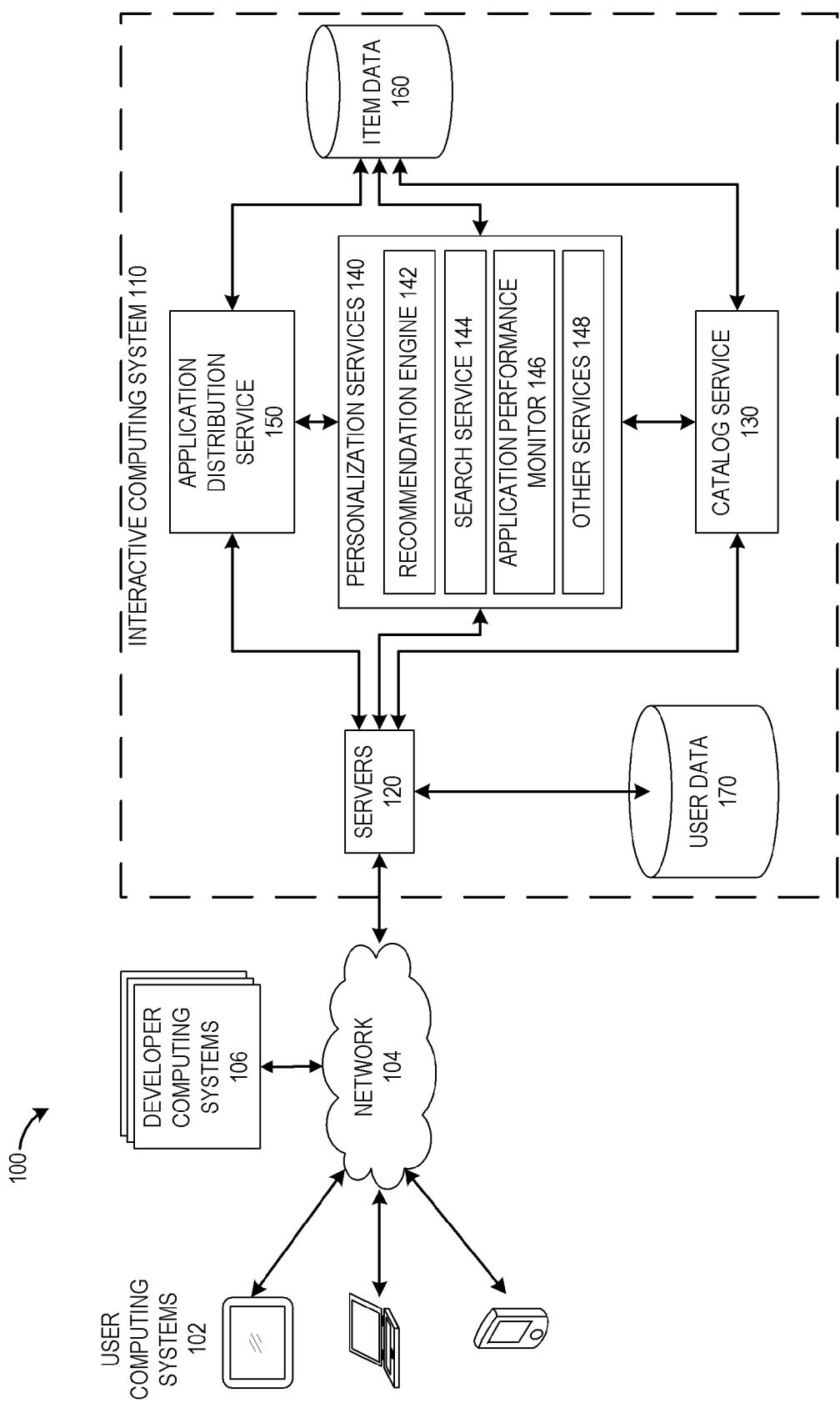
FIG. 1 illustrates an embodiment of a network environment for providing users with access to an interactive computing system.

Personalized recommendations are often generated for users based on a user's interactions in an electronic catalog, which can include user purchases and item selections (e.g., page requests). Typically, the recommendations do not take into account where or how the user will actually use the item as, in many cases, where or how an item is used has minimal effect on the user's satisfaction. For example, when a user selects a book to purchase, typically the decision of which book to select is based on the book's content and not where the user reads the book. As a second example, when a user is selecting a barbeque grill, the user typically makes a decision based on a number of factors inherent to the barbeque grill itself, and, in most cases, not where the user will use the grill.

However, for applications, or apps, the device that executes the application can be as important as the features of the application itself. Currently-available recommendation systems typically do not factor the environment or device characteristics for the device that the user will use to execute the application when making recommendations.

This disclosure describes systems and associated processes for generating recommendations for users based on the computing device likely to be utilized by the user to execute an application, among other things. These systems and processes are described in the context of an interactive computing system that enables users to download applications for mobile devices (such as phones) or for other computing devices. The performance of applications running on the user's computing device can be monitored with the performance data being collected and provided to the interactive computing system. The interactive computing system can include a recommendation system or service that processes the performance data and using the performance data, among possibly other data, the recommendation system can recommend alternative applications to the user for download. Further, in some cases, the interactive computing system can recommend modifications to the user's computing device to improve the performance of the application running on the user's computing device. Many other embodiments are also possible and are described in greater detail below.

For purposes of illustration, the processes disclosed herein are described primarily in the context of an interactive computing system that provides applications for download. As will be apparent, however, the disclosed processes can also be used in other types of systems, and can be used to recommend other types of items, such as but not limited to products and services, electronic books ("ebooks"), web sites, news articles, blogs, podcasts, discussion boards, photos and other images, online videos, and other types of data that may be consumed on a computing device. In addition, the disclosed processes need not be implemented as part of, or in conjunction with, a web site.

As used herein, the term "application," in addition to having its ordinary meaning, can mean, among other things, executable code or instructions, interpreted code or instructions (such as Java™ bytecode or the like), scripted code, source code, object code, assembly code, any of the above together with associated data, and the like. Further, the term "application" can include data that can be accessed by an application. For example, as indicated above, embodiments described herein can be used to recommend ebooks (e.g, based on the file format) or a video file (e.g., based on a particular compression standard).

Interactive Computing System Overview

FIG. 1 illustrates an embodiment of a network environment 100 for providing users with access to an interactive computing system 110. In the environment 100, users can access the interactive computing system 110 with user computing systems 102. The interactive computing system 110 can collect application (or other data) performance information, or performance data, for a set of performance characteristics associated with the applications from the user computing systems 102. The interactive computing system 110 can analyze this performance data to determine how well the application performs on the user computing systems 102, which can form the basis for personalized application (or other item) recommendations. In some embodiments, the interactive computing system 110 can also use the performance data to generate recommendations of changes to the user computing systems 102 to improve performance of the application. Further, in some cases, the performance data can be used to generate recommendations for developers to make improvements to their applications or to support different, or additional, user computing systems 102. The interactive computing system 110 can also generate many other types of recommendations, some examples of which are described herein.

The user computing systems 102 and the developer computing systems 106 that access the interactive computing system 110 can include computing devices, such as desktop computers, laptop computers, tablets, personal digital assistants (PDAs), mobile phones (including smart phones), electronic book readers, other wireless devices, set-top or other television boxes, media players, game platforms, and kiosks, among others. In some embodiments, at least some of the user computing systems 102 may also be developer computing systems 106 and vice versa. Embodiments of the user computing systems 102 are described in more detail below with respect to FIG. 2.

The user computing systems 102 and developer computing systems 106 access the interactive computing system 110 over a network 104, which can include any type of network. For example, the network can be a local area network, a wide area network, a cellular network, combinations of the same, and the like. In some embodiments, the network can include the Internet.

The interactive computing system 110 can be implemented with one or more physical servers or computing machines. Thus, each of the components depicted in the interactive computing system 110 can include hardware and/or software for performing various features. In one embodiment, the interactive computing system 110 is a web site or a collection of web sites. The interactive computing system 110 can provide access to applications developed by an entity associated with or an operator of the interactive computing system 110. Further, in some cases, the interactive computing system 110 may provide access to applications developed by developers and/or entities that are different from the entity of operator of the interactive computing system 110. For instance, developers can provide applications to the interactive computing system 110 via, for example, the developer computing systems 106.

The interactive computing system 110 includes an application distribution service 150. The application distribution service 150 can be an application store or the like that makes applications available for download or streaming to the user computing systems 102, for free or upon payment. The application distribution service 150 can include components for browsing and/or searching a catalog of applications, which may be stored in an item data repository 160. The application distribution service 150 can, but need not, rely on the functionality of a separate catalog service 130 (described below) for this browse and/or search functionality.

The interactive computing system 110 also includes personalization services 140, which can include services for providing personalized information to users. Examples of personalization services 140 include a recommendation service provided, for example, by a recommendation engine 142, a personalized search service 144, an application monitoring service that can be performed by an application performance monitor 146, and other services 148 such as a tag-based service. The recommendation engine 142 is described in detail below. The search services 144 can recommend personalized search results to users based on an analysis of previous search behavior. Tag-based services can provide functionality for users to apply textual tags to items in the catalog to thereby categorize the items. Other personalization services can include list services for allowing users to create lists of items, blogging services, personalized social networking services, and the like.

Advantageously, in certain embodiments, the recommendation engine 142 can generate performance-based recommendations. The recommendation engine 142 can generate these recommendations using performance data collected from the user computing systems 102. As an example, the recommendation engine 142 can collect data regarding the impact of an application on battery life of a user computing system 102, memory usage of an application, processor utilization of an application, use of storage space on the user computing system 102 by the application, and the like. Further, in some cases, the recommendation engine 142 can also collect usage information relating to the application on the user computing device 102. For example, the recommendation engine 142 can collect usage times and frequency related to the application as well as usage information related to other applications, such as whether and what other applications are running while the user is executing the application. With the performance data, and in some cases the usage data, the recommendation engine 142 can identify alternative applications that may satisfy the user's need while providing the user with better performance, such as reduced processor or memory usage or increased stability on the user computing system 102.

The recommendation engine 142 can use the application performance monitor 146 to collect the performance data and/or usage data of applications on user computing systems 102. Alternatively, or in addition, the recommendation engine 142 can obtain the performance and/or usage data from a system included with the user computing system 102 as is described further below with respect to FIG. 2. In some cases, the performance data and/or usage data may be stored at the user data repository 170, which can be accessed by the recommendation engine 142. Further, performance data for alternative applications may be stored at the item data repository 160. In some cases, the item data repository 160 may also include performance data for the application generally, as opposed to performance data of a user's specific instance of the application on the user's user computing system 102.

The recommendation engine 142 can use any of a variety of algorithms for generating the recommendations. For example, the recommendation engine 142 can use item-to-item or user-to-user similarity recommendations to identity alternative applications, including, for example, any of the algorithms described in U.S. Pub. No. 2002/0010625, filed Mar. 29, 2001, titled "Content Personalization Based on Actions Performed During a Current Browsing Session," the disclosure of which is hereby incorporated by reference in its entirety. The recommendation engine 142 can then use a priori (or in some cases real-time) analysis of the alternative applications to determine whether the alternative applications are expected to provide better performance (e.g., lower memory usage, improved responsiveness to user input) compared to the user's existing application. Alternatively, or in addition, the recommendation engine 142 can recommend changes to the user computing system 102 to improve performance of the application on the device or system. Moreover, in some cases, the recommendation engine 142 can recommend application modifications to the developer of the application and/or additional devices the developer should consider supporting.

The interactive computing system 110 also includes a catalog service 130 and associated search engine (not shown). Users can browse an electronic catalog provided by the catalog service 130 or query the search engine to obtain information about electronic catalog content stored in an item data repository 160. In one embodiment, these items can include items other than (or in addition to) applications, such as media (books, audio, video, etc.), clothes, electronics, and appliances, to name a few. The electronic catalog content can include detailed information about these products as well as services. In one embodiment, this content is arranged in a hierarchical structure, having items associated with one or more categories or browse nodes in a hierarchy. The catalog service 130 can provide functionality for users to browse the item hierarchy in addition to searching the catalog. This functionality may be provided, for example, by the search service 144. Users can select an item represented in the hierarchy or in a list of search results to see more details about an item. In response to a user item selection, the server 120 can provide to a user computing system 102 a catalog page (sometimes called an item detail page) that includes details about the selected item. In one embodiment, the applications available for download from the application distribution service 150 are also described in this catalog.

The processing of the various components of the interactive computing system 110 can be distributed across multiple machines, networks, and other computing resources. The various components of the interactive computing system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Example User Computing System

Figure 2:
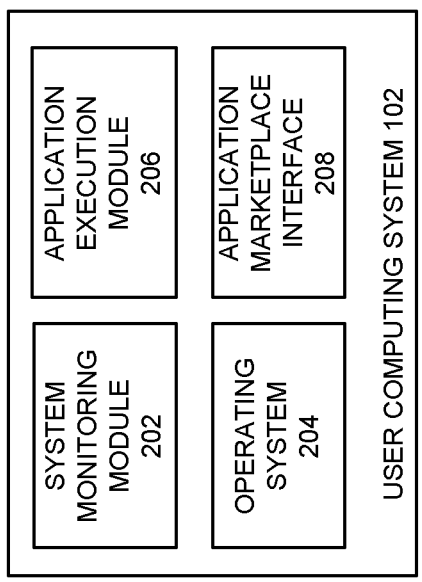
FIG. 2 illustrates an embodiment of a user computing system that can interact with an interactive computing system.

FIG. 2 illustrates an embodiment of a user computing system 102 that can interact with an interactive computing system 110. As previously stated, the user computing system 102 can include any type of computing device, such as a tablet or smart phone. The user computing system 102 includes a system monitoring module 202, an operating system 204, an application execution module 206, and an application marketplace interface 208. In some embodiments, some or all of the systems illustrated in FIG. 2 as part of the user computing system 102 may be optional. Further, in some cases, some or all of the systems illustrated in FIG. 2 may be combined. Moreover, the user computing system 102 is not limited to the systems shown in FIG. 2 and may include any number of additional hardware and/or software systems, such as a processor, memory, storage, and applications.

The system monitoring module 202 can include any system that can monitor the state of the user computing system 102. Monitoring the state of the user computing system 102 can include monitoring resource utilization. For example, the system monitoring module 202 can monitor the utilization of a processor or memory during execution of an application. In some cases, the system monitoring module 202 may be part of the operating system 204. The operating system 204 can include any type of operating for operating the user computing system 102. For example, the operating system 204 may include a Microsoft® Windows® operating system, an Apple® operating system, an Android® operating system, a Unix® based operating system, etc.

Applications may be executed on the user computing system 102 via an application execution module 206. In some embodiments, the application execution module 206 can provide a sandbox environment that can facilitate with monitoring the performance of an application. In other embodiments, the application execution module 206 may be included as part of the system monitoring module 202 or may be optional.

The application marketplace interface 208 can interact with the interactive computing system 110. In some cases, the application marketplace interface 208 may provide performance data and/or usage data related to the execution of an application to one or more systems of the interactive computing system 110, such as the application performance monitor 146. The application marketplace interface 208 may provide the data in response to a user request and/or automatically. Alternatively, or in addition, the application performance monitor 146 may request the data from the application marketplace interface 208. In some embodiments, the application marketplace interface 208 may receive from the recommendation engine 142 recommendations of alternative applications, or modifications to an application's settings or settings of the user computing system 102 to improve performance of the application. The application marketplace interface 208 can then present the recommendations to the user. In some embodiments, the application marketplace interface 208 may be an application and/or may include a browser, such as a web browser.

In some embodiments, the systems of the interactive computing system 110 and the processes described herein can function with any user computing system and do not require any modifications to systems or processes of the user computing system. As such, in some cases, the system monitoring module 202, the application execution module 206 and the application marketplace interface 208 may each be optional and/or included as part of the operating system's 204 native functionality. For example, the application performance monitor 146 can query the operating system 104 of the user computing system 102 to obtain performance data using utilities, processes, Application Programming Interfaces (APIs), libraries (e.g., Dynamic Link Libraries (DLLs)), or any other interfaces or tools native to the operating system 102 for obtaining information relating to the operating system 102 and applications interacting with the operating system 102.

Example Performance-Based Substitute Application Recommendation Process

Figure 3:
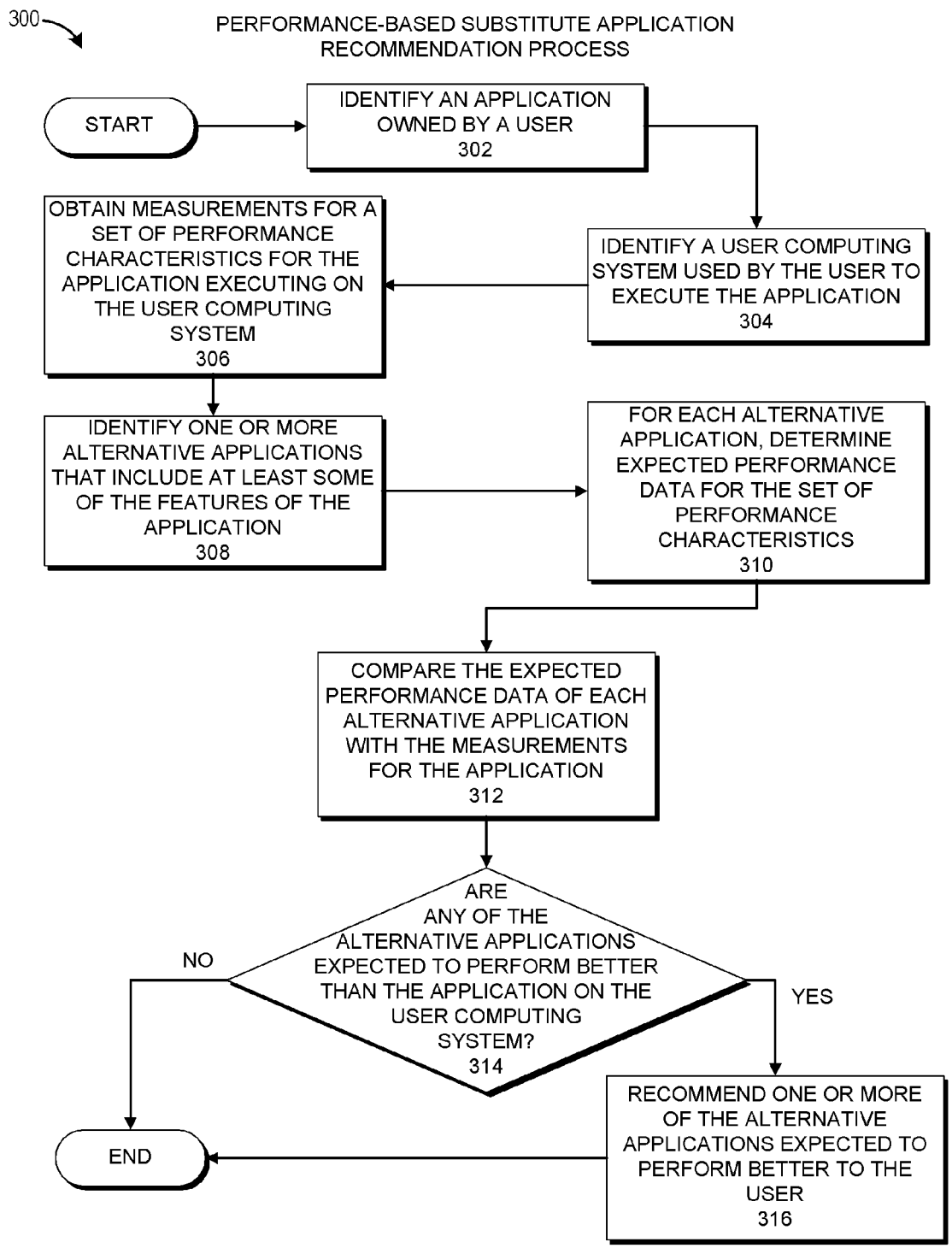
FIG. 3 illustrates an embodiment of a performance-based substitute application recommendation process.

FIG. 3 illustrates an embodiment of a performance-based substitute application recommendation process 300. The process 300 can be implemented by any system that can recommend an alternative application to a user based, at least in part, on the performance of an existing application user by the user on a user computing system 102. For example, the process 300, in whole or in part, can be implemented by the interactive computing system 110, the servers 120, the recommendation engine 142, the application performance monitor 146, the application distribution service 150, the system monitoring module 202, the application execution module 206, or the application marketplace interface 208, to name a few. Although any number of systems, in whole or in part, can implement the process 300, to simplify discussion, portions of the process 300 will be described with reference to particular systems.

To simplify discussion, embodiments of this disclosure, including process 300, will be described with respect to applications owned by a user. However, this disclosure is not limited as such. This disclosure, including the process 300, can be applied to applications rented, licensed, borrowed, or otherwise accessible by a user whether or not the user owns the application.

The process 300 begins at block 302 where, for example, the recommendation engine 142 identifies an application owned by a user. As indicated above, the block 302 may identify any application the user can access including non-owned applications, such as licensed applications. The recommendation engine 142 may identify the application by accessing an entry at the user data repository 170 that is associated with the user. Alternatively, or in addition, the recommendation engine 142 may identify the application by accessing the user's user computing system 102 via, for example, the application marketplace interface 208, a DLL made available by the operating system 204, the system monitoring module 202, or the application execution module 206. Further, the application may be identified at the point or time of the application being downloaded or obtained from, for example, the interactive computing system 110. Alternatively, as described above, the application may be identified by accessing stored information relating to downloaded applications. In some cases, entitlements to applications may be stored on the network, such as at the user data repository 170. Thus, the application entitlements may be accessed to identify the application.

At block 304, the recommendation engine 142 identifies a user computing system 102 used by the user to execute the application identified at the block 302. Identifying the use computing system 102 can include identifying one or more pieces of metadata associated with the user computing system 102. This metadata can include any information about the user computing system 102 including, the type of device, the operating system installed on the device, utilization of resources on the device, etc. As with the application, the user computing system 102 may be identified by accessing an entry at the user data repository 170 that is associated with the user. Further, the user computing system 102 may be identified by accessing the user computing system 102 itself.

At block 306, the application performance monitor 146 obtains measurements, or performance data, for a set of performance characteristics for the application executing on the user computing system 102. These performance characteristics can include any type of characteristics related to how the application performs on the user computing system 102 or the impact of the application on the user computing system 102. For example, the performance characteristics can relate to: battery life; utilization of memory, processor, or storage resources on the user computing system 102; display resolution; network usage (e.g., the amount of data sent over a cellular data network); and speed or rate of responsiveness to user input. In some embodiments, the performance characteristics may include features available on the application.

Further, the measurements obtained at the block 306 may be instantaneous measurements or measurements that give a value for a performance characteristic at a particular point in time. Alternatively, or in addition, the measurements may be some aggregation of measurements for a performance characteristics over time. For example, processor utilization may be measured over an entire usage period of an application, over a plurality of usage periods of the application, over a number of days, etc. Further, these measurements over time may be continuous measurements or intermittent measurements. The application performance monitor 146 may average the measurements over the period of time, sum the measurements, identify a peak measurement, calculate the median measurement, calculate the mode measurement, or perform any other process for aggregating and/or analyzing the measurements collected over the measurement time period. In certain embodiments, the measurements may include a combination of instantaneous measurements and measurements obtained over time The recommendation engine 142, at block 308, identifies one or more alternative applications that are substantially similar to or include at least some of the features of the application identified at the block 302. These alternative applications can be identified using any system or process for identifying applications that share features. For example, the alternative applications may be applications that share a browse node with the application identified at the block 302. As a second example, the alternative applications may be identified using an item-to-item mapping algorithm to identify applications related to the application identified at the block 302. Further, the alternative applications may be identified based on application type, application features, or any other characteristics that can be used to compare applications. In some cases, the alternative applications are associated with the same product or application category as the application at the electronic catalog provided by the catalog service 130. The alternative applications, in certain embodiments, may share the same primary function as the application. For example, each of the applications may be email applications. Although the applications may share the primary function of sending and receiving email, the applications may include various additional functions that may or may not be shared by some or all of the other applications, such as a calendar function or the ability to highlight priority email.

In some embodiments, the recommendation engine 142 identifies alternative applications that include all of a set of particular features, or at least a subset of particular features. These particular features may be specified by a user or identified by analyzing other applications purchased by the user or the features of the application that the user utilizes.

At block 310, for each alternative application identified at the block 308, the application performance monitor 146 determines expected performance data for the set of performance characteristics measured at the block 306. The expected performance data can be based on a number of factors. These factors can include information reported by the developer of the application, tests (e.g., benchmarks) performed by an entity associated with the interactive computing system 110, measurements or performance data collected from users who use the alternative applications, etc. Further, the tests may be performed on or the measurements may be collected from user computing systems that are the same type or model as the user computing system 102 identified at the block 304. Moreover, the user computing systems tested, or from which the performance data is collected, may have the same configuration or resource load (e.g., running similar applications) as the user computing system 102 identified at the block 304. In some embodiments, the expected performance data includes a range of values for the set of performance characteristics for each alternative application. Alternatively, or in addition, the expected performance data can include a probability value representing an estimated probability that a performance characteristic will have a certain value if the alternative application is utilized instead of the application identified at the block 302. In an embodiment, the probability value may be based on a scale other than [0, 1].

At block 312, the recommendation engine 312 compares the expected performance data of each alternative application with the measurements of the application obtained at the block 306. Comparing the expected performance data and the measurements can include weighting particular performance characteristics so that the weighted performance characteristics have more impact in the result of the comparison. Further, comparing the expected performance data and the measurements can include comparing an expected value for each performance characteristic with the measurement for the performance characteristic to determine whether the expected value is higher (or lower if appropriate for the performance characteristic) than the measured value.

In some cases, the expected value is compared against a threshold value that is based on the measured value. Advantageously, in some cases, by using a threshold value instead of the measured value as the comparison point, the recommendation engine 142 can avoid recommending applications that are marginally or insignificantly better than the application identified at the block 302. For example, the recommendation engine 142 would not recommend an application solely on the basis that it uses 1 kb less memory if a memory utilization threshold is set such that an alternative application should use 128 kb less memory to be identified as better compared to the application identified at the block 302. The thresholds may vary based on the performance characteristic including, in some cases, the weight applied to the performance characteristic. For example, if memory utilization is weighted higher than other performance characteristics, the threshold of the previous example may be set to 64 kb instead of 128 kb. On the other hand, if memory utilization is weighted lower than other performance characteristics, the threshold may be set to 256 kb.

In some embodiments, comparing the expected performance data of each alternative application may include comparing the expected performance of the alternative applications on other user computing devices 102 used by the user to the performance of the application identified at the block 302 on the other user computing devices 102. If measurement values are not available for the other user computing devices, the recommendation engine 142 may use expected values for the application identified at the block 302 running on the other user computing devices 102. The decision of whether to include comparisons of applications running on the other user computing devices 102 may be based on user input and/or an analysis of usage data for the other user computing devices 102 with respect to the application or in general. Advantageously, in certain embodiments, by including an analysis of the alternative applications running on other user computing devices 102 as part of the block 312, the recommendation engine 142 can avoid recommending an alternative application that, although potentially better than the application identified at the block 302, the user is unlikely to purchase due to the alternative application's performance or ability to be executed on the user's other user computing devices 102.

At decision block 314, the recommendation engine 142 determines whether any of the alternative applications are expected to perform better than the application identified at the block 302 on the user computing system 102. The decision block 314 may include determining whether any of the alternative applications are expected to perform a threshold amount better than the application. Determining whether any of the alternative applications are expected to perform better than the application may include determining the probability that an alternative application is expected to perform better than the application.

In some embodiments, the decision block 314 may take into account additional features that may be available on an alternative application. For example, an alternative application that is not better, or not a threshold amount better, than the application based on the comparison of performance characteristics may be included in the set of "better" applications based on additional features available on the alternative application.

If the recommendation engine 142 does not identify any alternative applications that are better than the application based on the compared performance characteristics, the process 300 ends. Alternatively, the process 300 may be repeated for other applications. On the other hand, if the recommendation engine 142 determines that alternative applications exist that are better, or have an above-threshold probability of being better, than the application based on the compared performance characteristics, the recommendation engine 142 recommends one or more of the alternative applications expected to perform better to the user at the block 316. The recommendation engine 142 may select randomly the alternative application to recommend from the one or more alternative applications. Alternatively, the recommendation engine 142 may use one or more selection factors to select the alternative application. These selection factors can include any factor for selecting an alternative application from a set of alternative applications. For example, the selection factor may be based on the relative performance comparisons of the alternative applications (e.g., the alternative application that performed the best compared to the application), the brand of the alternative applications, the number or type of additional features available, popularity or ratings for the alternative applications, etc. In some embodiments, the alternative application may be an application that the user already owns or is authorized to access, but which the user has not downloaded to the user computing system 102. For example, the alternative application may be an application purchased for a different user computing system of the user. In such cases, the recommendation engine 142 may indicate to the user that the recommended alternative application is an application owned or accessible by the user, but which the user has not downloaded or configured for the user computing system 102 identified at the block 304.

The recommendation of the application may be presented to the user in response to a user request or may be presented to the user without any input or trigger from the user. Further, the recommendation may be presented to the user in an email, on a web page (e.g., an item detail page associated with an application or a related application), on a special recommendations are or in a page area reserved for recommendations, as a text-message, as part of a recommendation application, in a voice message, or in any other way that a recommendation may be presented to a user. It should be understood that the presentation of recommendations is not equivalent to the presentation of search results. For example, search results are generally generated in response to a query involving search terms. Process 300 may be used to recommend alternative applications to a user without the user initiating a search.

Example Device-Based Recommendation Process

Figure 4:
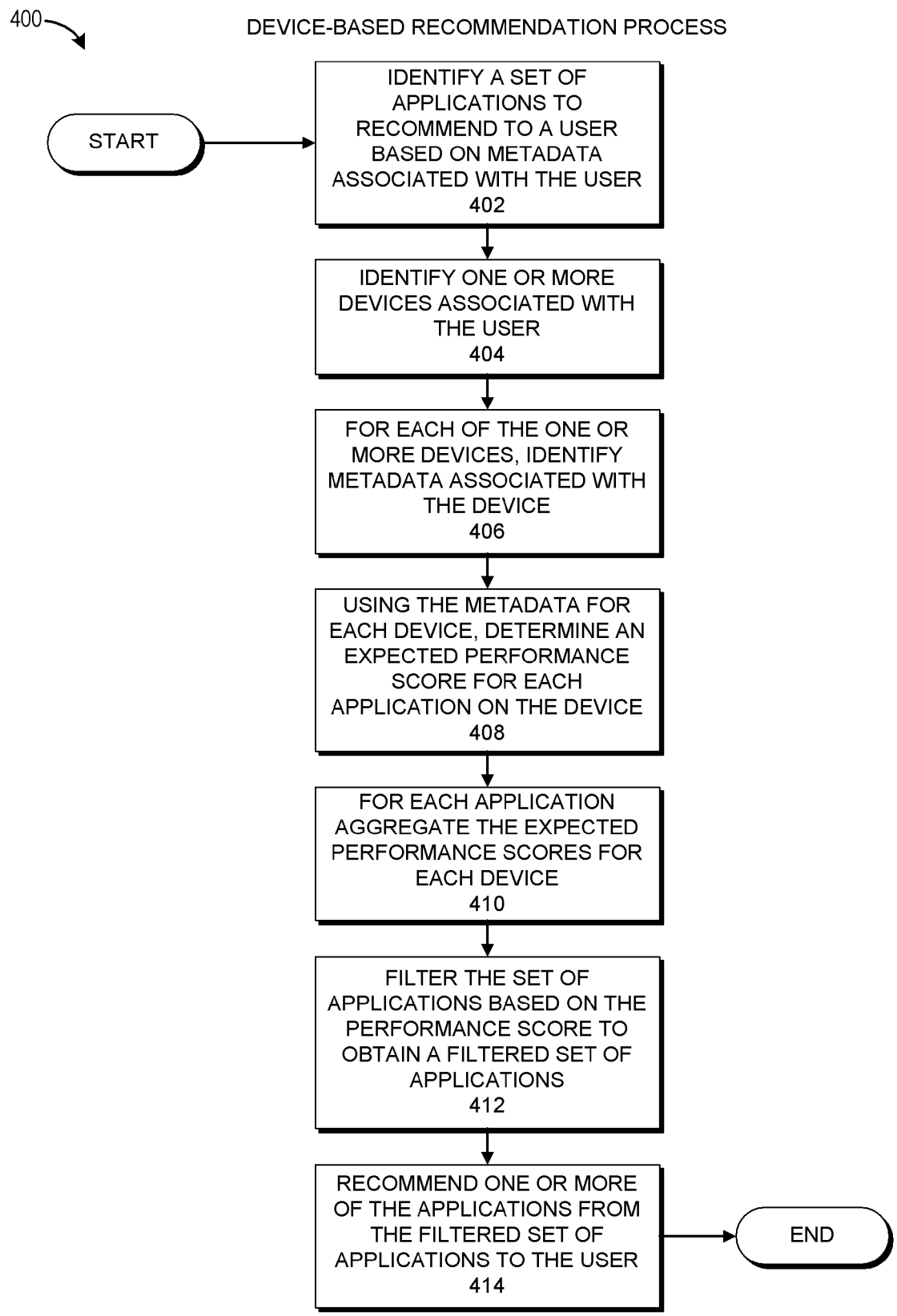
FIG. 4 illustrates an embodiment of a device-based recommendation process.

FIG. 4 illustrates an embodiment of a device-based recommendation process 400. The process 400 can be implemented by any system that can recommend an application to a user based, at least in part, on one or more user computing systems 102 of the user. For example, the process 400, in whole or in part, can be implemented by the interactive computing system 110, the servers 120, the recommendation engine 142, the application performance monitor 146, the application distribution service 150, the system monitoring module 202, the application execution module 206, or the application marketplace interface 208, to name a few. Although any number of systems, in whole or in part, can implement the process 400, to simplify discussion, portions of the process 400 will be described with reference to particular systems.

The process 400 begins at block 402 where, for example, the recommendation engine 142 identifies a set of applications to recommend to a user based, at least in part, on metadata associated with the user. The set of applications may be identified based on any recommendation process. For example, the set of applications may be identified based on applications purchased by users who view the item-details page of the same application the user viewed. The metadata associated with the user can include any information about the user, the user's actions with respect to the electronic catalog 130, or the user's usage of the user computing system 102. For example, the metadata can include the user's age or gender, the applications viewed or purchased by the user, the frequency with which the user plays game applications on the user computing system 102, etc.

At block 404, the recommendation engine 142 identifies one or more devices (e.g., user computing systems 102) associated with the user. These devices may be identified by accessing an entry associated with the user at the user data repository 170. Alternatively, or in addition, the devices may be identified based on information provided by the user. For each of the one or more devices, the recommendation engine 142 identifies metadata associated with the device at the block 406. This device metadata can include any information related to the device. For example, the device metadata may include model information, device type information, specifications for the device, configuration of the device, operating system used or installed on the device, applications installed and/or running on the device, etc.

Using the metadata for each device, the recommendation engine 142 using, for example, the application performance monitor 146, determines an expected performance score for each application on the device at block 408. The expected performance score may be based on one or more of the previously described performance characteristics. In some cases, the performance score constitutes a combination of values for the one or more performance characteristics. In other cases, the performance score may be a set of scores. For instance each performance characteristic may be analyzed separately rather than combined into a single performance score. Alternatively, some performance characteristics may be combined while others are treated independently. As with the block 310, the expected performance scores may be based on benchmarks or on executing the identified applications on test devices. Further, the expected performance scores may be based on information gathered from other users' devices that run the identified applications. In some cases, the block 408 can include some or all of the embodiments described above with respect to the block 310.

For each application, the recommendation engine 142 aggregates, at block 410, the expected performances scores for each device identified at the block 404. The recommendation engine 142 can use any aggregation process, such as averaging or summation to aggregate the performance scores. In some embodiments, the block 410 may be optional. For example, each device identified at the block 404 may be evaluated separately and an application may be recommended if any device supports the application regardless of whether some or most of the devices do not support the application or do not provide a threshold level of performance for the application. In other embodiments, the recommendation engine 142 may only recommend applications that run on all of the devices, on a threshold percentage of devices, or on a particular subset of devices associated with the user. In some embodiments, the devices may be weighted based on the user's usage of the devices. For example, if a user relatively infrequently uses a device to run applications compared to other devices of the user, the device, and/or its performance scores, may be weighted to reduce the device's impact on recommending an application. As a second example, if the user typically uses a particular device for running game applications, and another device for running work applications, the devices may be weighted differently based on the application under consideration.

At block 412, the recommendation engine 142 filters the set of applications based on the performance scores, or aggregated performance scores, to obtain a filtered set of applications. For example, the recommendation engine 142 may filter the applications to exclude applications below a threshold performance score. Further, the recommendation engine 142 may filter applications based on the number of devices of the user that can run the application or whether particular devices can run the application. In some embodiments, the block 412 may rank the applications instead of or in addition to filtering the applications.

The recommendation engine 142 can recommend one or more of the applications from the filtered set of applications to the user at block 414. In some embodiments, the block 414 can include some or all of the embodiments described above with respect to the block 316.

The process 400 may be repeated with additional applications. For example, if the block 412 reduced the number of applications to recommend to zero, the recommendation engine 142 may select a new set of applications at the block 402 and repeat the process 400.

Although described with respect to recommendations, in some cases the process 400 can be used with search results. For example, the set of applications identified at the block 402 can be identified based on a search initiated by a user. The applications presented to the user at the block 414 can then include search results that were not filtered out at the block 412.

Example Synchronization-Based Recommendation Process

Figure 5:
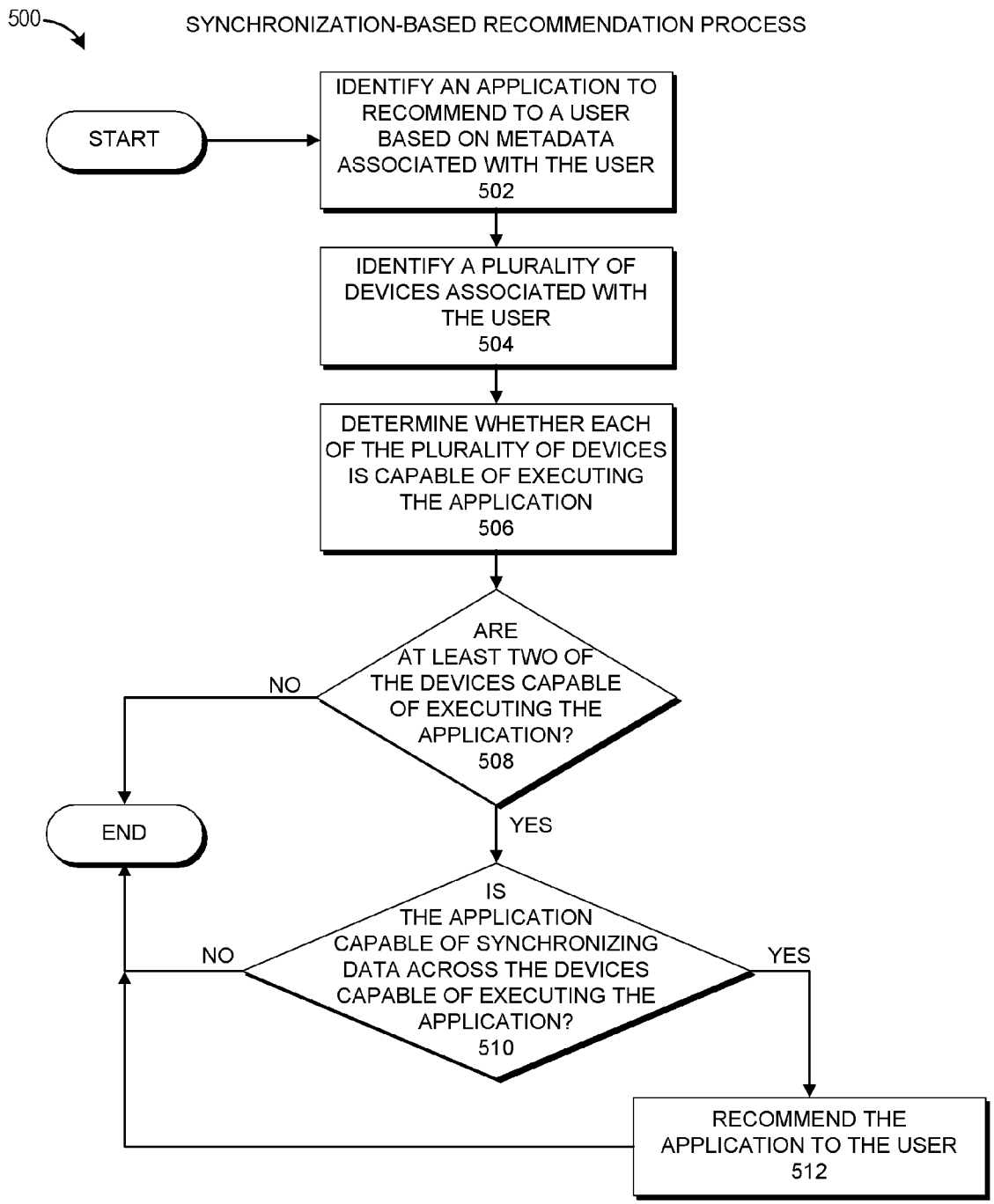
FIG. 5 illustrates an embodiment of a synchronization-based recommendation process.

FIG. 5 illustrates an embodiment of a synchronization-based recommendation process 500. The process 500 can be implemented by any system that can recommend an application to a user based, at least in part, on the application's ability to synchronize data across devices. For example, the process 500, in whole or in part, can be implemented by the interactive computing system 110, the servers 120, the recommendation engine 142, the application performance monitor 146, the application distribution service 150, the system monitoring module 202, the application execution module 206, or the application marketplace interface 208, to name a few. Although any number of systems, in whole or in part, can implement the process 500, to simplify discussion, portions of the process 500 will be described with reference to particular systems.

The process 500 begins at block 502 where, for example, the recommendation engine 142 identifies an application to recommend to a user based on metadata associated with the user. In certain embodiments, the block 502 can include one or more of the embodiments described above with respect to the block 402. At block 504, the recommendation engine 142 identifies a plurality of devices (e.g., user computing systems 102) associated with the user. In certain embodiments, the block 504 can include one or more of the embodiments described above with respect to the block 404.

Using, for example, the application performance monitor 146, the recommendation engine 142 determines whether each of the plurality of devices is capable of executing the application at the block 506. This determination may be made based on specifications for the devices, information provided by the developer for the application, benchmarks of the application running on instances of the devices, tests of the application and/or instances of the devices performed by an entity associated with the interactive computing system 110, or any other process for determining whether each of the plurality of devices is capable of executing the application. In certain embodiments, the block 506 includes determining whether each of the plurality of devices is capable of executing the application with a threshold level of performance. The level of performance of an application running on a device may be measured by the utilization of resources by the application running on the device or any other measure for determining a level of performance (e.g., benchmarks). In some embodiments, the block 506 may include one or more of the embodiments described above with respect to the block 306 and/or the block 310.

At decision block 508, the recommendation engine 142 determines whether at least two of the devices identified at the block 504 are capable of executing the application. In some cases, the recommendation engine 142 determines whether at least two of the devices are capable of executing the application with at least a threshold level of performance. In some embodiments, the decision block 508 may determine whether at least a threshold number of the devices identified at the block 504 are capable of executing the application, or are capable of executing the application with a threshold level of performance. The threshold level of devices may be set by the user, the entity (or a representative thereof) associated with the interactive computing system 110, or any other user or system that can set the threshold level of devices. Further, in some cases, the threshold level of devices may include all of the devices identified at the block 504.

If the recommendation engine 142 determines at the decision block 508 that there are not at least two devices capable of executing the application, the process 500 ends. Alternatively, the process may be repeated with another application. If the recommendation engine 142 determines at the decision block 508 that there are at least two devices capable of executing the application, the recommendation engine 142 using, for example, the application performance monitor 146 determines at decision block 510 whether the application is capable of synchronizing data across the devices capable of executing the application. If not, the process 500 ends, or may be repeated with another application. If the recommendation engine 142 determines at the decision block 510 that the application is capable of synchronizing data across the devices capable of executing the application, the recommendation engine 142 recommends the application to the user at the block 512. In some embodiments, the application will be recommended if at least two devices capable of executing the application can synchronize the data of the application. In some embodiments, the block 512 may include one or more embodiments described above with respect to the blocks 316 and 414.

In some embodiments, the previously mentioned threshold level of devices may be a single device. In such cases, the process 500 may be used to identify applications capable of running on the device and synchronizing data on another device. However, in some cases, this other device may not be a device that is identified at the block 504.

The process 500 can be used for any type of application or synchronization process. Further, in some cases, determining whether data can be synchronized between devices for the application includes determining the method of synchronization. For instance, the process 500 may be used to recommend applications that run on user computing systems 102, but are synchronized via the cloud, or a network computing system (e.g., a computing systems hosted by the interactive computing system 110 or a developer computing system 106). As another example, the process 500 may be used to recommend applications that run, at least in part if not completely, on a computing device in the interactive computing system 110, or some other non-user computing system, but which is capable of synchronizing user data to multiple user computing systems 102.

Example Configuration-Adjustment Recommendation Process

Figure 6:
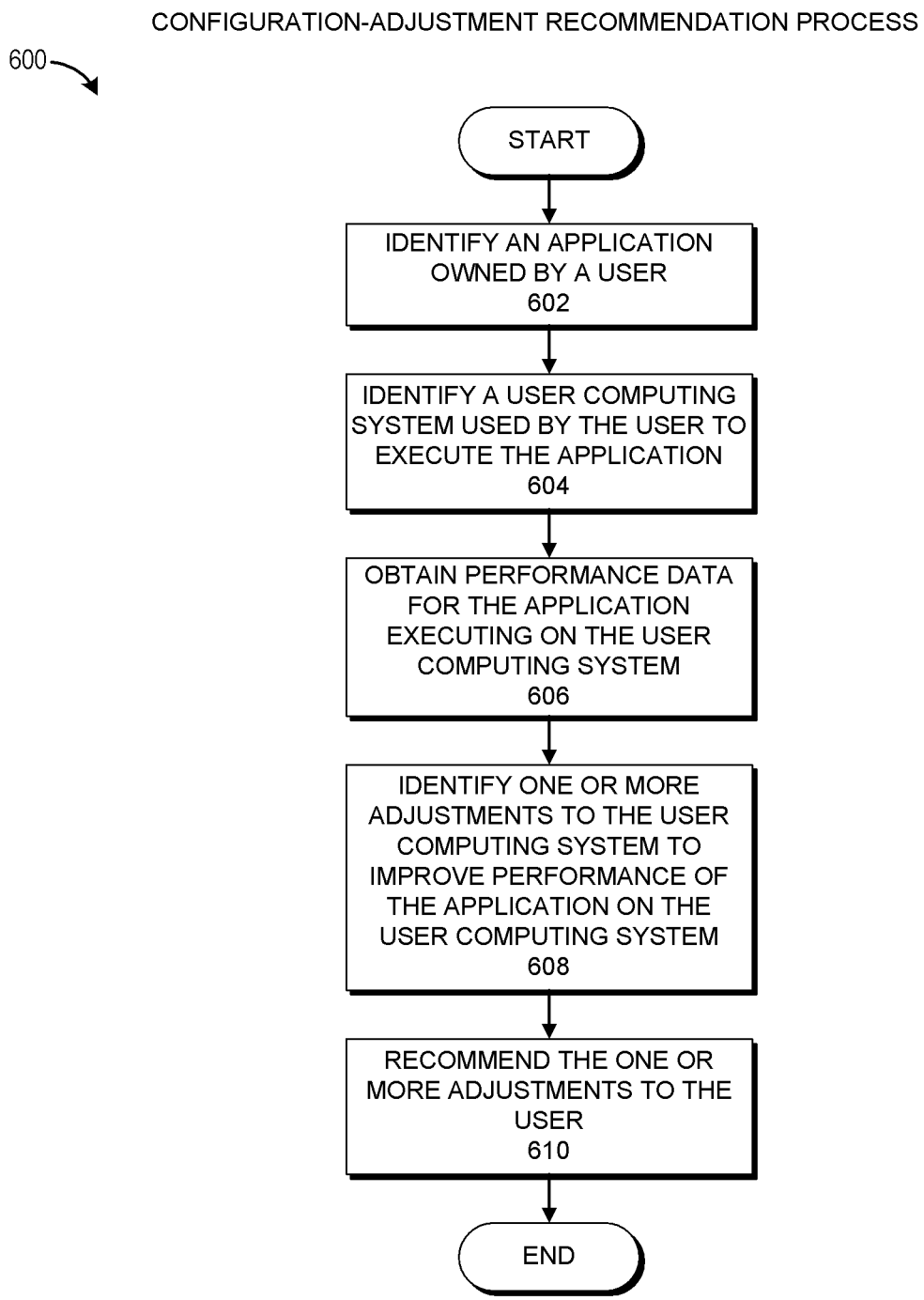
FIG. 6 illustrates an embodiment of a configuration-adjustment recommendation process.

FIG. 6 illustrates an embodiment of a configuration-adjustment recommendation process 600. The process 600 can be implemented by any system that can recommend modifications to a user computer system 102 to improve performance of an application executing on the user computer system 102. For example, the process 600, in whole or in part, can be implemented by the interactive computing system 110, the servers 120, the recommendation engine 142, the application performance monitor 146, the application distribution service 150, the system monitoring module 202, the application execution module 206, or the application marketplace interface 208, to name a few. Although any number of systems, in whole or in part, can implement the process 600, to simplify discussion, portions of the process 600 will be described with reference to particular systems.

The process 600 begins at block 602 where, for example, the recommendation engine 142 identifies an application owned by a user. In certain embodiments, the block 602 can include one or more of the embodiments described above with respect to the block 302. At block 604, the recommendation engine 142 identifies a user computing system 102 used by the user to execute the application identified at the block 602. In certain embodiments, the block 604 can include one or more of the embodiments described above with respect to the block 304.

At block 606, the application performance monitor 146 obtains performance data for the application executing on the user computing system 102. Obtaining the performance data can include obtaining measurements for one or more performance characteristics as described above with respect to the block 306. In some embodiments, the block 606 can include one or more of the embodiments described above with respect to the block 306.

At block 608, the application performance monitor 146 identifies one or more adjustments to the user computing system 102 to improve the performance of the application on the user computing system 102. These adjustments may include any type of adjustment that a user can make to the user computing system 102 running the application. As different user computing systems 102 generally have different capabilities, often at least some of the adjustments identified will be dependent on the model or type of user computing system 102. Some non-limiting examples of the adjustments can include: modifying battery settings (e.g., recharge timing); modifying display settings (e.g., display brightness); modifying memory allocation; modifying processor settings; modifying network settings; and the like.

Further, in some embodiments, the adjustments can include modifying the application's execution. For example, the adjustments can include downloading one or more application components or application data a priori or at some time instance relative to execution of the application (e.g., at application start or at specific execution points of the application) instead of streaming the components or data from, for example, a server during use of the application. Moreover, the adjustments can include modifications to other applications running on the user computing system 102. For example, the adjustments may include ceasing execution of another application; pausing execution of another application; adjusting the capabilities of another application while the application identified at the block 602 is executing; etc.

Adjustments to the user computing system 102, the application, or other applications may be determined based, at least in part, on data collected from any source that can provide data facilitating the determination of the adjustments. For example, the adjustments may be based on information provided by the application developer; data obtained from other systems that execute the application; data obtained by an entity (e.g., the entity associated with the interactive computing system 110 or a third-party entity) testing the application; etc.

At block 610, the recommendation engine 142 recommends one or more adjustments to the application and/or to the user computing system 102 to the user. The adjustments can include any changes to the application and/or the user computing system 102 that can improve the performance of the application and/or user computing system 102 while executing the application. For example, the adjustments can include changing display settings, network settings, applications executing on the user computing system 102, settings within the application (e.g., synchronization rate, autosave settings, etc.), battery settings, etc. Further, improving performance can relate to adjusting any performance characteristic, such as increasing battery life, decreasing network usage, decreasing memory usage, decreasing processor utilization, decreasing response time to user commands, or adjusting any type of performance characteristic identified by a user or developer of an application. The recommendations may be presented to the user via any method for presenting a recommendation. For example, the recommendation may be presented via email, text message, a system status box on the user computing system 102, a web page, etc. In some embodiments, some adjustments identified at the block 608 may be filtered from the identified adjustments and the recommendation engine 142 may not present the filtered adjustments to the user. The filter may be based on usage information, application feature or functionality, or any other basis for filtering an application. For example, an adjustment to cease operation of another application may be filtered from the set of adjustments to be recommended if the other application is a system status monitoring application or a battery monitoring application. As a second example, an adjustment to cease operation of another application may be filtered from the set of adjustments to be recommend if usage information associated with the application indicates that the user frequently (e.g., more than a threshold) accesses the application even, in some cases, while the application identified at the block 602 is executing.

Alternatively, or in addition, to the block 610, the application performance monitor 146 may automatically implement the suggested adjustments. In some cases, the adjustments are automatically implemented in response to a setting activated by the user or in response to a user indicating approval for the interactive computing system 110 to automatically adjust settings to the application or user computing systems 102. In some embodiments, the recommendation engine 142 may present the suggested adjustments to the user and upon the user indicating a desire to implement the suggestions, the application performance monitor 146, or a system on the user computing system 102 (e.g., the system monitoring module 202 or the application execution module 206) may automatically make the suggested adjustments.

In some embodiments, one or more adjustments to the user computing system 102, or the application identified at the block 602, may be presented to a developer of the application instead of or in addition to the user. By providing adjustments to the developer, in some cases the developer can make improvements to a release of the application, provide support for additional devices, or reduce support for certain devices (e.g., devices that cannot run the application with a threshold level of performance).

Example Recommendations User Interface

Figure 7:
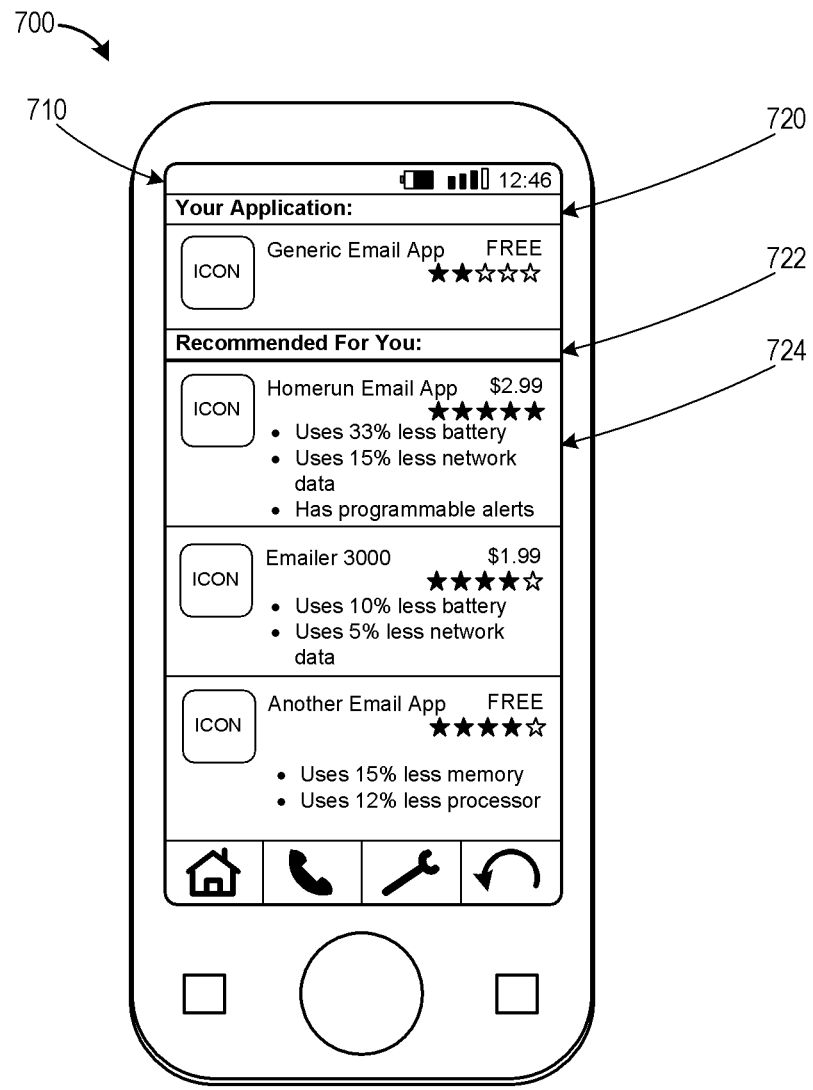
FIG. 7 illustrates an embodiment of a mobile device having a user interface for displaying recommendations.

FIG. 7 illustrates an embodiment of a mobile device 700 having a user interface for displaying recommendations. The mobile device 700 is in the form of a mobile handheld device, smart phone, or the like. The mobile device 700 is one non-limiting example of a user computing system 102 and can include some or all of the embodiments described herein with respect to the user computing systems 102. The mobile device includes a display screen 710 that includes an application 720 available to a user of the mobile device 700. Further, the display screen 710 can present a set of alternative applications 722 that are recommended to the user.

As illustrated in FIG. 7, the alternative applications can include a list of reasons that the applications were recommended. For example, application 724 is recommended to the user because it uses less battery and less network data than the user's current email application. In addition, the application 724 is recommended because it includes an additional feature, the ability to setup programmable alerts. Further, in some cases, the display screen 710 may present recommendations of changes to the configuration of the mobile device 700 to improve the application 720 or the performance of the application 720 on the mobile device 700.

The user can select one or more of the recommended alternative applications 722 to download the application(s). The recommendations user interface displayed on the display screen 710 is merely one example of many formats that can be used to display recommendations, other examples of which are described in U.S. Publication No. 2002/0198882, filed Jan. 14, 2002, titled "Content Personalization Based on Actions Performed During a Current Browsing Session," the disclosure of which is hereby incorporated by reference in its entirety.

Additional Embodiments

Additional embodiments of the present disclosure include a method for providing performance-based recommendations that can be implemented by the recommendation engine 142. The method can include identifying an application accessible by a user on a computing device and identifying an alternative application that is similar to the application. Further, the method may include calculating a score based, at least in part, on an estimated probability that the alternative application will provide better performance on the computing device than the application. Moreover, the method may include determining whether the score satisfies a threshold. In response to determining that the score satisfies the threshold, the method may include recommending the alternative application to a user of the computing device. In some embodiments, the score is based, at least in part, on the first performance value and the second performance value. Moreover, the score may comprise the estimated probability that the alternative application will provide better performance on the computing device than the application.

In some embodiments, the method may include identifying a performance characteristic of the application and measuring the performance characteristic of the application running on the computing device to obtain a first performance value. Further, the method may include obtaining a second performance value corresponding to the alternative application. The second performance value may be determined probabilistically based on collected performance data for the alternative application executing on a set of computing devices.

Further, the method may include identifying the user's satisfaction level with the application and setting the threshold based on the user's satisfaction level. Moreover, the method may include identifying the alternative application based, at least in part, on a set of application features associated with the alternative application and the application.

Terminology

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of the personalization services 140 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for providing performance based recommendations, the method comprising:
   by computer hardware comprising one or more processors:
   identifying an application accessible by a user on a computing device;
   identifying a set of application features associated with the application, wherein the set of application features include one or more capabilities of the application;
   identifying alternative applications that include at least a subset of the set of application features;
   determining whether at least one of the alternative applications is expected to provide better performance on the computing device than the application based, at least in part, on expected performance data associated with each of the alternative applications, wherein the expected performance data is determined based at least in part on simulations performed on a plurality of devices that share at least some device characteristics with the computing device, and wherein the at least some device characteristics comprise device characteristics that affect the performance of the alternative application; and in response to determining that at least one of the alternative applications is expected to provide better performance on the computing device, recommending an alternative application from the alternative applications that is expected to provide better performance on the computing device.

2. The method of claim 1, further comprising:
identifying a set of performance characteristics for the application; and
obtaining measurements for the set of performance characteristics, the measurements associated with executing the application on the computing device.

3. The method of claim 2, wherein determining whether at least one of the alternative applications is expected to provide better performance comprises:
accessing the expected performance data for each of the alternative applications, the expected performance data associated with anticipated values for the set of performance characteristics if the alternative application were executed on the computing device; and
comparing the expected performance data, for each of the alternative applications, to the measurements for the set of performance characteristics for the application to identify the alternative application to recommend.

4. The method of claim 3, wherein comparing the expected performance data, for each of the alternative applications, to the measurements for the set of performance characteristics further comprises weighting at least some of the set of performance characteristics.

5. The method of claim 3, wherein the anticipated values are based on benchmarks of running the alternative applications on a set of computing devices.

6. The method of claim 3, wherein the anticipated values are based on probabilistic determinations of values for the set of performance characteristics if the alternative application were executed on the computing device.

7. The method of claim 2, further comprising:
identifying, based at least in part on the measurements for the set of performance characteristics, a modification to the application to improve performance of the application on the computing device; and
recommending the modification to the application to a developer of the application.

8. The method of claim 1, wherein recommending the alternative application that is expected to provide better performance on the computing device from the set of alternative applications further comprises:
identifying a second computing device associated with the user; and
selecting the alternative application to recommend based, at least in part, on whether the second computing device can execute the alternative application.

9. The method of claim 1, further comprising:
determining a configuration of the computing device;
determining whether a change to the configuration of the computing device is expected to improve performance of the application on the computing device; and
in response to determining that the change to the configuration of the computing device is expected to improve performance of the application on the computing device, recommending the change to the user.

10. A system for providing performance based recommendations, the system comprising:
a recommendation engine comprising computer hardware, the recommendation engine configured to:
identify a first application accessible by a user on a computing device;
identify a second application that is similar to the first application and that is classified as having a first performance characteristic on the computing device that differs from a second performance characteristic of the first application on the computing device, wherein the second application is determined to be similar to the first application based on a set of overlapping application features associated with the first application and the second application, the set of overlapping application features including one or more functional attributes of the first application and the second application; and
recommend the second application in response to determining that the second application is expected to provide better performance on the computing device than the first application, wherein the determination is based at least in part on simulations performed on a plurality of devices that share at least some device characteristics with the computing device, and wherein the at least some device characteristics comprise device characteristics that relate to the performance of the alternative application.

11. The system of claim 10, wherein the recommendation engine is further configured to:
identify a set of performance characteristics for the first application; and
obtain measurements for the set of performance characteristics, the measurements associated with executing the first application on the computing device.

12. The system of claim 11, wherein the recommendation engine is further configured to obtain the measurements for the set of performance characteristics from a system monitoring module included on the computing device.

13. The system of claim 11, wherein the recommendation engine is further configured to:
determine expected performance data for the second application, the expected performance data associated with anticipated values for the set of performance characteristics if the second application were executed on the computing device; and
compare the expected performance data for the second application to the measurements for the set of performance characteristics for the first application to determine whether to recommend the second application.

14. The system of claim 11, wherein the recommendation engine is further configured to weight at least some of the set of performance characteristics.

15. The system of claim 11, wherein the recommendation engine is further configured to:
identify, based at least in part on the measurements for the set of performance characteristics, a modification to the first application to improve performance of the first application on the computing device, and
recommend the modification to the first application to a developer of the first application.

16. The system of claim 10, further comprising a user data repository configured to store identities of computing devices accessible by the user, and wherein the recommendation engine is further configured to:

access the user data repository to identify a second computing device associated with the user; and select the second application to recommend based, at least in part, on whether the second computing device can execute the second application.

17. The system of claim 10, wherein the recommendation engine is further configured to:

determine a configuration of the computing device and determine whether a change to the configuration of the computing device is expected to improve performance of the first application on the computing device; and recommend the change to the user in response to determining that the change to the configuration of the computing device is expected to improve performance of the first application on the computing device.

18. The system of claim 10, wherein determining whether the second application is expected to provide better performance on the computing device than the first application comprises receiving a result of the determination from an application performance monitor configured to determine whether the second application is expected to provide better performance on the computing device than the first application.

19. Non-transitory physical computer storage comprising computer-executable instructions that direct a computing system to perform a method for providing performance based recommendations, the method comprising:

identifying an application on a computing device;

identifying a performance characteristic for the application;

obtaining performance data for the performance characteristic associated with the computing device executing the application;

providing the identity of the application, the performance characteristic, and the performance data to a recommendation engine;

in response to providing the identity of the application, the performance characteristic, and the performance data to the recommendation engine, receiving a recommendation to use an alternative application from the recommendation engine, wherein the alternative application provides a different expected performance than the application on the computing device, wherein the alternative application includes one or more interactive features included by the application, and wherein the expected performance is determined based at least in part on simulations performed on a plurality of devices that share at least some device characteristics with the computing device, wherein the at least some device characteristics comprise device characteristics that have a relationship to the performance of the alternative application; and outputting for presentation to a user of the computing device the identity of the alternative application.

20. The non-transitory physical computer storage of claim 19, wherein identifying the application comprises receiving the identity of the application from the recommendation engine and wherein identifying the performance characteristic for the application comprises receiving the identity of the performance characteristic from the recommendation engine.

21. The non-transitory physical computer storage of claim 19, wherein the method further comprises outputting for presentation to the user of the computing device explanatory text providing a reason for recommending the alternative application.

22. The non-transitory physical computer storage of claim 21, wherein the reason indicates that the alternative application is expected to provide better performance for the performance characteristic.

23. The non-transitory physical computer storage of claim 19, wherein the performance characteristic comprises at least one of the following: battery life, memory utilization, processor utilization, network usage, and data storage usage.

* * * * *